United States Patent
Haberland

(10) Patent No.: US 9,304,196 B2
(45) Date of Patent: Apr. 5, 2016

(54) MOTOR VEHICLE WITH A RADAR MECHANISM AND PROCEDURE FOR THE OPERATION OF A RADAR MECHANISM

(75) Inventor: Udo Haberland, Holzgerlingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 982 days.

(21) Appl. No.: 13/053,402

(22) Filed: Mar. 22, 2011

(65) Prior Publication Data

US 2011/0234449 A1  Sep. 29, 2011

(30) Foreign Application Priority Data

Mar. 24, 2010  (DE) .................. 10 2010 012 626

(51) Int. Cl.
*G01S 13/93* (2006.01)
*G01S 13/34* (2006.01)

(52) U.S. Cl.
CPC .............. *G01S 13/343* (2013.01); *G01S 13/931* (2013.01); *G01S 2013/9332* (2013.01); *G01S 2013/9385* (2013.01); *G01S 2013/9389* (2013.01)

(58) Field of Classification Search
CPC .......... G01S 13/931; G01S 2013/9332; G01S 2013/9385; G01S 2013/9389
USPC .......................................................... 342/70
See application file for complete search history.

(56) References Cited

U.S. PATENT DOCUMENTS

| | | | |
|---|---|---|---|
| 5,245,347 A * | 9/1993 | Bonta et al. ................... | 342/149 |
| 5,309,409 A * | 5/1994 | Jones et al. .................... | 367/103 |
| 2004/0257265 A1 | 12/2004 | Gottwald | |
| 2005/0083227 A1* | 4/2005 | Takano et al. .................. | 342/70 |
| 2006/0158369 A1* | 7/2006 | Shinoda et al. ................ | 342/70 |
| 2007/0018884 A1* | 1/2007 | Adams ...................... | G01S 3/30 342/147 |
| 2007/0030347 A1 | 2/2007 | Jecker et al. | |
| 2009/0260511 A1* | 10/2009 | Melnychuk et al. .......... | 89/1.11 |
| 2010/0097264 A1* | 4/2010 | Kawasaki et al. .............. | 342/70 |

FOREIGN PATENT DOCUMENTS

| | | | |
|---|---|---|---|
| DE | 10316637 | A1 | 10/2004 |
| DE | 10343331 | A1 | 4/2005 |
| DE | 102004019651 | A1 | 11/2005 |
| DE | 102006043953 | A1 | 3/2008 |
| EP | 0 740 166 | A1 | 10/1996 |
| WO | 0106276 | A1 | 1/2001 |

OTHER PUBLICATIONS

German Office Action for Application No. 10 2010 012 626.8, mailed on Jul. 1, 2010 (4 pages).

* cited by examiner

*Primary Examiner* — Timothy A Brainard
(74) *Attorney, Agent, or Firm* — Osha Liang LLP

(57) ABSTRACT

The invention relates to a motor vehicle with a radar device (3, 4) which is designed for detecting an object (25) located in a detection zone (7, 8) of the radar device (3, 4), wherein the detection zone (7, 8) is defined by an elevation angle zone ($\delta_1$, $\delta_2$) and an azimuth angle zone ($\alpha$), wherein the elevation angle zone ($\delta_1$, $\delta_2$) also covers at least such a partial angle zone ($\delta_1$) which lies within an angle interval of 15° to 90° above a horizontal (33) defined with respect to the motor vehicle (1).

10 Claims, 3 Drawing Sheets

MOTOR VEHICLE WITH A RADAR MECHANISM AND PROCEDURE FOR THE OPERATION OF A RADAR MECHANISM

The invention relates to a motor vehicle with a radar device which is designed for detecting an object located in a detection zone of the radar device. The detection zone is defined by an elevation angle zone and an azimuth angle zone. Furthermore, the invention relates to a method for operating a radar device in a motor vehicle by means of which objects located in the detection zone of the radar device can be detected.

The use of radar devices in driver assistance systems of motor vehicles is already known from the prior art, namely from the publication DE 10 2006 043 953 A1. The radar device detects a region lateral of the motor vehicle—a so-called dead angle zone—as well as a region behind the motor vehicle. Altogether, there are two radar devices attached to a rear bumper of the motor vehicle, and the respective detection zones of the radar device overlap each other behind the motor vehicle. In their respective detection zones, the radar devices can trace objects, namely in particular a relative position of an object with respect to the motor vehicle as well as a relative speed of the object with respect to the motor vehicle.

Radar devices for motor vehicles are also known from the publications EP 0 740 166 B1, DE 10 2004 019 651 A1 and WO 01/06276 A1. In the subject matter according to the publication EP 0 740 166 B1, the sensor device comprises an antenna group with such a directional characteristic, the main lobe of which is relatively wide in the azimuth direction—that is, in the horizontal direction—and is relatively narrow in the elevation direction—that is, in the vertical direction. The width of the main lobe in the elevation direction is approximately 15°.

Of particular interest here is the monitoring of the dead angle zone of motor vehicles. For this purpose, radar systems and also methods have already been developed in which solutions are shown on how objects in the dead angle zone of a motor vehicle can be reliably detected and even classified. Such a radar system is described in the publication DE 10 2004 019 651 A1.

It is the object of the invention to provide a solution on how the detection of objects in the surrounding area of a motor vehicle of the aforementioned type—in particular in a dead angle zone—can be improved in comparison with the prior art.

This object is solved according to the invention by a motor vehicle with the features according to patent claim 1 as well as by a method with the features according to patent claim 11. Advantageous embodiments of the invention are subject matter of the dependent claims and the description.

For a motor vehicle according to the invention, a radar device is designed for detecting an object located in a detection zone of the radar device. The detection zone is defined by an elevation angle zone and an azimuth angle zone. The elevation angle zone also covers at least such a partial angle zone which lies within an angle interval of 15° to 90° above a horizontal defined with respect to the motor vehicle.

Thus, according to the invention, the radar device detects in the vertical direction such an angle zone which is covered within an angle interval of 15° to 90° above the horizontal. In other words, the radar device is able to transmit electromagnetic waves into the mentioned partial angle zone—that is, in the direction obliquely upwards with respect to the motor vehicle—, wherein said waves have such a strength which allows to detect objects located in this partial angle zone. The radar device can radiate an electromagnetic wave into the partial angle zone, wherein the power of said wave lies above a predetermined value, namely in particular with respect to a power radiated by the radar device in a main radiation direction—for example of a main lobe. This value can be, for example, 15 dB lower than the power radiated in the main direction.

The invention is based on a plurality of findings: Firstly, it is based on the finding that in the prior art, trucks can not always be detected by the radar device. Furthermore, the invention is based on the finding that a so-called underrun protection for trucks is not required by law in all countries. The invention is further based on the finding that such an underrun protection is usually attached at the same height as the radar device which can be arranged, for example, on a rear bumper. The invention is further based on the finding that in cases in which such an underrun protection is not present on a truck, an electromagnetic wave emitted by the radar device is not reflected by this truck and said truck therefore can not be detected by the radar device. The invention is finally based on the finding that this can be circumvented in that the radar device—in particular in addition to horizontally emitted electromagnetic waves—emits also electromagnetic waves in the vertical direction in an angle zone which is covered within an angle interval of 15° to 90° above the horizontal.

According to this, the motor vehicle according to the invention has the advantage that the radar device is able to detect also such objects which are located laterally above the motor vehicle, namely, for example, trucks without underrun protection. In particular, with the radar device, such trucks can be detected which have a relatively large distance between the tractor unit and the last rear axle and the freight is carried at a height of at least approximately 1.5 m above the ground. The radar device of the motor vehicle according to the invention can detect such trucks as well and warn the driver in an adequate manner. If the radar device is used for monitoring the dead angle zone, thus—in contrast to the prior art—no interruption of a dead angle alarm occurs and the safety during lane changes can be increased. Therefore, it is ensured that a chronologically constant detection of a truck takes place.

Thus, the entire elevation angle zone covers such a partial angle zone which lies within an angle interval of 15° to 90° above the horizontal. The lower limit value of this angle interval can be a value from the following set: {15, 16, 17, 18, 19, 20, 21, 22, 23, 24, 25, 26, 27, 28, 29, 30, 31, 32, 33, 34, 35, 36, 37, 28, 29, 40}.

In order to achieve a reliable detection of a freight of a truck, the partial angle zone—which is also covered by the entire elevation angle zone—can lie within an angle interval of 30° to 60° above the horizontal. In this manner it is achieved, on the one hand, that the truck is detected over its entire length; on the other, the elevation angle zone has an upper limit so that interferences between the signals of the radar device and satellite signals can be reduced to a minimum.

In addition to the partial angle zone which lies within the angle interval of 15° to 90° above the horizontal, the entire elevation angle zone of the radar device can also cover a further partial angle zone which is covered within an angle interval of −10° to +10° with respect to the horizontal. Then, the radar device also radiates electromagnetic waves quasi in the horizontal direction. In this manner, the radar device can also detect low objects—for example passenger cars—which are at the same height as the radar device. In this embodiment, the elevation angle thus covers, on the one hand, a partial angle zone from the angle interval of −10° to +10° and, on the other, a partial angle zone from the angle interval of 15° to 90°.

The radar device is preferably used in the motor vehicle for monitoring a dead angle zone of the motor vehicle. In one embodiment, the azimuth angle thus covers at least a section of the dead angle zone. This can be implemented, for example, in such a manner that in the horizontal direction, the radar device detects a region lateral of the motor vehicle as well as a region behind the motor vehicle. Additionally or alternatively, many different uses of the radar device are possible in a useful manner in the motor vehicle. For example, the information obtained through the radar device can be used for lane change assistance and/or early accident detection and/or distance warning and or lane departure warning and/or for a parking aid system.

With respect to the technical implementation of the radar device, many different embodiments are provided:

The radar device can have such an antenna unit, the directional characteristic of which comprises in the vertical direction a main lobe horizontally aligned with an accuracy of 10° and a side lobe which encloses with the main lobe an angle from an angle interval of 10° to 90°, in particular of 30° to 60°. This can take place, for example, in such a manner that the antenna unit comprises a large number of individual antenna elements which are arranged in an array. In particular, the antenna unit can include a plurality of antenna rows which are arranged on top of each other and which each have a plurality of individual antenna elements. Above the antenna rows, such a phase distribution can be set in the vertical direction—preferably by an adequate fixed wiring—which provides for the mentioned directional characteristic including the main lobe and the side lobe. Thus, it can be achieved without much effort that the radar device is able to detect low objects as well as such objects which are above the motor vehicle such as, for example, trucks.

In one embodiment, the side lobe encloses an angle of 45° with the main lobe.

For example, it can be a transmitting antenna unit of the radar device, the directional characteristic of which comprises in the vertical direction a main lobe horizontally aligned with an accuracy of 10° and a side lobe which encloses with the main lobe an angle from an angle interval of 10° to 90°, in particular of 30° to 60°. In this embodiment, the transmitting antenna unit radiates electromagnetic waves in the direction defined by the main lobe as well as in the direction defined by the side lobe. With respect to a receiving antenna unit, principally, two embodiments can be provided here: The receiving antenna unit can have such a vertical directional characteristic which corresponds to the vertical directional characteristic of the transmitting antenna unit and thus comprises a main lobe and a side lobe. Such an approach has the advantage that the receiving antenna unit can receive only such electromagnetic waves which arrive from the direction in which the transmitting antenna unit transmits signals. Thus, the receiving antenna unit receives only the reflected signals transmitted by the transmitting antenna unit. Alternatively, the directional characteristic of the receiving antenna unit can have in the vertical direction such a wide main lobe through which the entire elevation angle zone can be covered. Such a receiving antenna unit can be provided in a technically simple manner.

If the directional characteristic of the receiving antenna unit of the radar device comprises a main lobe and a side lobe, the above mentioned alternatives apply correspondingly to the vertical directional characteristic of the transmitting antenna unit: Then, the transmitting antenna unit can have such a vertical directional characteristic which corresponds to the directional characteristic of the receiving antenna unit and thus comprises a main lobe and a side lobe. Alternatively, the directional characteristic of the transmitting antenna unit can comprise such a wide main lobe through which the entire elevation angle zone can be covered.

With respect to the power distribution between the main lobe and the side lobe it was found to be particularly advantageous if a power ratio of main lobe to side lobe is smaller than 20 dB. Preferably, the power ratio of main lobe to side lobe lies in a value zone of 10 dB to 15 dB. In this manner it is made possible, on the one hand, to detect objects located obliquely above the motor vehicle; on the other, the range of the radar device in the direction of the main lobe is not significantly influenced.

It can be provided that the side lobe of the directional characteristic of the antenna unit—whether it is the transmitting and/or receiving antenna—can be switched on depending on the requirements. This can take place, for example, in such a manner that one or more antenna elements are switched on or off depending on the requirements. Thus, in this embodiment, the side lobe is generated only if it is really necessary.

According to an alternative, a total of two transmitting antenna units can be used, the respective directional characteristics of which comprise only a main lobe but no side lobes. The main lobes of the directional characteristics of the two transmitting antenna units can then enclose an angle from an angle interval of 10° to 90°, in particular 30° to 60°. For example, main lobes of the directional characteristics of the two transmitting antenna units can enclose an angle of approximately 45°. Thus, in this embodiment, two existing conventional transmitting antenna units can be used to achieve an improved detection zone in the vertical direction.

According to a further alternative, the vertical directional characteristic of the transmitting antenna unit as well as the receiving antenna unit can comprise such a wide main lobe through which in each case the entire elevation angle zone can be covered. In this embodiment, an increased detection of ground clutter has to be expected; however, this embodiment can be implemented in a particularly simple technically manner. It is only necessary to provide a transmitting antenna unit and a receiving antenna unit each with a wide vertical antenna diagram, and the radar device can detect low objects as well as high objects.

According to yet another alternative it is provided that an antenna unit of the radar device—whether it is the transmitting antenna unit and/or the receiving antenna unit—has such a directional characteristic, the main lobe of which is electronically swivelable in the vertical direction. In this embodiment, the side lobe is not needed. This can be implemented, for example, in such a manner that the receiving antenna unit has a wide vertical antenna diagram while the main lobe of the directional characteristic of the transmitting antenna unit is electronically swivelable in the vertical direction. For example, a control device can be provided which is designed for controlling a phase distribution over the transmitting antenna unit and to vertically swivel the main lobe in this manner.

Preferably, a continuous-wave radar is used as radar device which is configured for radiating a frequency modulated continuous electromagnetic wave (also known as FMCCW (Frequency Modulated Continuous Wave) radar). With such a radar device it is possible to determine the distance of an object from said radar device as well as the relative speed of the object with respect to the radar device and the relative position. The radar device can comprise a receiver with which the receiving antenna unit is coupled. Such a receiver can comprise, for example, a mixer, a low-pass filter, a low-noise amplifier and an analog-to-digital converter. The signals received by the receiving antenna unit are then mixed down in the receiver into the baseband, low-pass-filtered and analog-to-digital-converted or discretized.

As already explained, it is preferred to use a separate transmitting antenna unit—whether it is an individual transmitting antenna or a transmitting antenna array—for the radar device. The transmitting antenna unit can be fed by means of a local oscillator for generating a transmit signal. The transmit signal can also be fed to the mixer in the receiver to mix the received signals down into the baseband. The transmission antenna unit can be phase-controlled at least in the horizontal direction in order to be able to cover in the horizontal direction a relatively wide azimuth angle zone with a narrow main lobe of the directional characteristic.

In a method according to the invention for operating a radar device in a motor vehicle, objects in the detection zone of said radar device are detected by the same. The detection zone is defined by an elevation angle zone and an azimuth angle zone. The radar device detects in the vertical direction such a partial angle zone which is covered in an angle interval of 15° to 90° above a horizontal defined with respect to the motor vehicle.

The preferred embodiments introduced with respect to the motor vehicle according to the invention and their advantages apply correspondingly to the method according to the invention.

Further features of the invention are apparent from the claims, the figures and the description of the figures. All features and feature combinations mentioned above in the description as well as the features and feature combinations mentioned hereinafter in the description of the figures or illustrated individually in the figures can be used not only in each of the described combinations but also in other combinations or alone.

The invention is now illustrated in more detail by means of individual preferred exemplary embodiments as well as with reference to the attached drawings.

In the figures.

In the Figs., identical and functionally identical elements are indicated with the same reference numbers.

Figure 1:
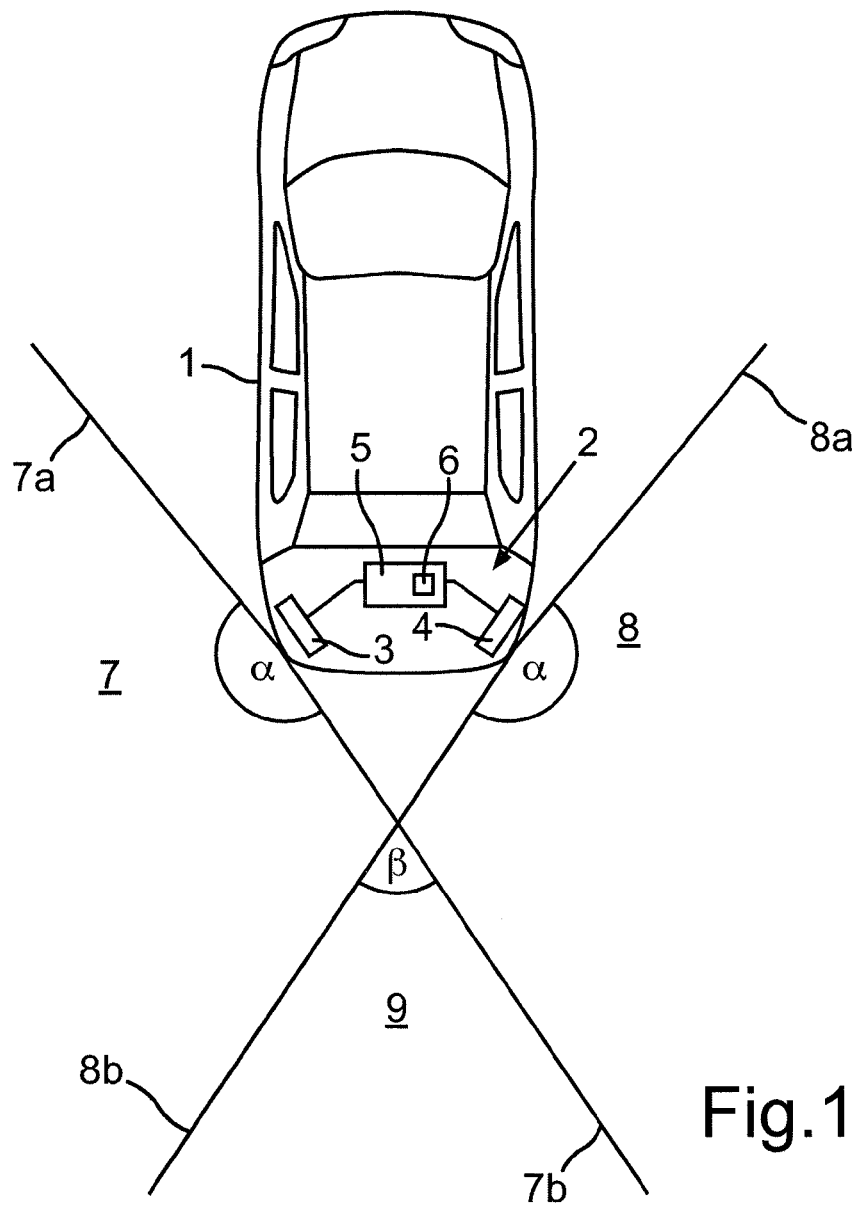
FIG. 1 shows in a schematic illustration a top view of a motor vehicle according to an embodiment of the invention.

A motor vehicle 1 illustrated in FIG. 1 comprises a driver assistance device 2 which assists the driver when driving the motor vehicle 1. The driver assistance device 2 can be, for example, a monitoring system for the dead angle and/or an early accident detection system, in particular for rear-end collisions, and/or an ACC (Adaptive Cruise Control) system. The driver assistance device 2 comprises a first radar device 3 and a second radar device 4. The first radar device 3 is arranged in a left corner of a rear bumper and the second radar device 4 is arranged in a right corner of the same bumper. The first and the second radar devices 3, 4 are coupled with a control device 5. The control device 5 can comprise, for example, a micro-controller 6 which is common for the first and the second radar devices 3, 4, and a digital signal processor. Alternatively, two micro-controller 6 and/or two digital signal processors can be provided which, for example, communicate which each other via a communication bus present in the motor vehicle 1.

The first radar device 3 covers a detection zone 7. The detection zone 7 is defined in the horizontal direction by an azimuth angle α which is bounded in FIG. 1 by two lines 7a, 7b. In the vertical direction (not illustrated in FIG. 1), the detection zone 7 is defined by an elevation angle zone. As is apparent from FIG. 1, the azimuth angle zone extends continuously between the lines 7a, 7b.

Correspondingly, the second radar device 4 has a detection zone 8 which is defined by a corresponding azimuth angle α and an elevation angle zone. The azimuth angle zone α is bounded by two lines 8a, 8b.

In the exemplary embodiment, the azimuth angle zones α are approximately 170°. The detection zones 7, 8 of the radar devices 3, 4 overlap each other so that an overlap region 9 is generated. The overlap region 9 is angularly bounded by the lines 7b, 8b. In the exemplary embodiment, the opening angle β of the overlap region 9 is approximately 70°.

In their respective detection zones 7, 8, the radar devices 3, 4 can locate objects. In particular, the radar devices 3, 4 can determine a distance of an object from the respective radar device 3, 4, a target angle and a relative speed of an object with respect to the motor vehicle 1. As is apparent from FIG. 1, the detection zones 7, 8 of the radar devices 3, 4 cover also the respective dead angle zones of the motor vehicle 1, that is, such zones which are not visible for the driver in the interior or exterior mirror.

Figure 2:
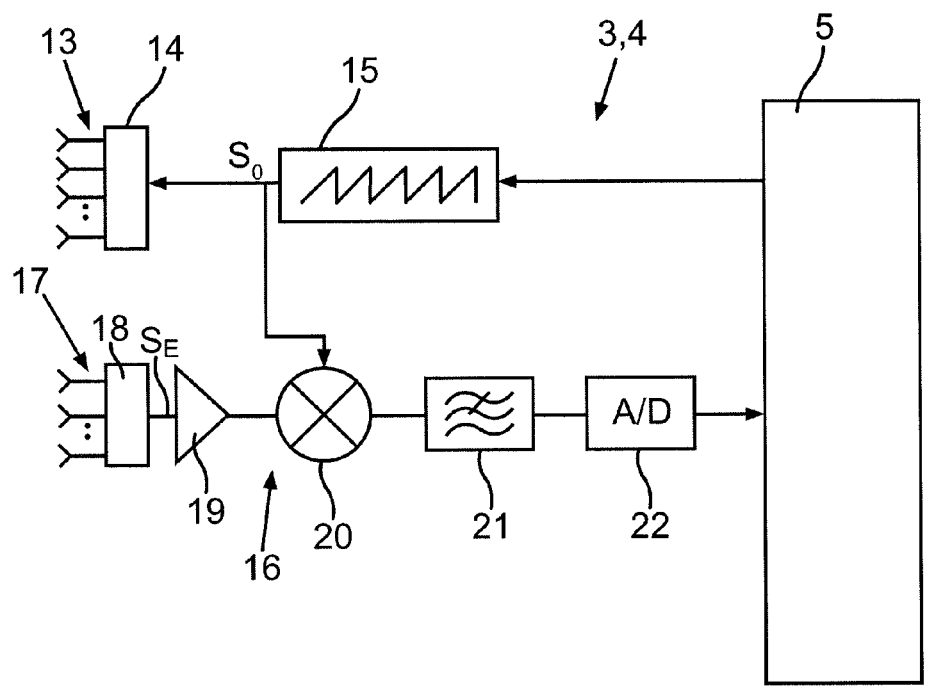
FIG. 2 shows a block diagram of a radar device as it is used in the motor vehicle according to FIG. 1.

FIG. 2 shows a block diagram of an individual radar device 3, 4 including the control device 5. The radar device 3, 4 comprises a transmitting antenna unit 13 which can be an antenna group or antenna array. The transmitting antenna unit 13 can comprise, for example, a plurality of patch antennas. The transmitting antenna unit 13 is fed via a feed circuit 14. The transmitting antenna unit 13 is fed by means of a local oscillator 15 which generates a transmit signal $S_O$. Said transmit signal $S_O$ is a frequency-modulated electromagnetic wave, the frequency of which has a sawtooth-shaped profile in the exemplary embodiment. Thus, the transmit signal $S_O$ is frequency-modulated; its frequency runs periodically between a first value of, for example, 23.8 GHz and a second value of, for example, 24.2 GHz. The average frequency of the transmit signal $S_O$ in the exemplary embodiment is 24 GHz.

The local oscillator 15 is controlled by the control device 5. The oscillator 15 is, for example, a voltage-controlled oscillator which generates the transmit signal $S_O$ with such a frequency which is dependent on the amplitude of a direct current voltage provided at the oscillator 15 by the control device 5.

The radar device 3, 4 also comprises a receiver 16. The receiver 16 comprises a receiving antenna unit 17 which can comprise a plurality of patch antennas in the exemplary embodiment. Likewise, the receiving antenna unit 17 can be a two-dimensional antenna array. The receiving antenna unit 17 is coupled with a feed circuit 18. The feed circuit 18 provides a signal $S_E$ which is a receive signal. The receive signal $S_E$ is amplified by means of a low-noise amplifier 19, mixed down by means of a mixer 20, low-pass-filtered by means of a low-pass filter 21 and analog-to-digital-converted by means of an analog-to-digital converter 22. For mixing down the received signal $S_E$, the transmit signal $S_O$ is used; the transmit signal $S_O$ is directed to the mixer 20, for example by means of a directional coupler. The received digital signal $S_E$ is then processed by means of the control device 5. From the signal $S_E$, the control device 5 determines, for example, the distance of the object, its relative speed as well as a target angle. In dependence on the received signal $S_E$, the control device 5 can also classify objects present in the dead angle zone of the motor vehicle 1; in particular, the control device 5 can distinguish between passenger cars and trucks as well as between passing vehicles and vehicles being passed.

FIG. 2 is a schematic diagram of the radar device 3, 4 and thus shows the operating mode of the radar device 3, 4 only schematically. For example, the radar device 3, 4 can also include further receivers 16 each with one receiving antenna unit 17; likewise, the radar device 3, 4 can include a plurality of transmitting units 13. Thus, the radar device 3, 4 illustrated in FIG. 2 is exemplary only.

Figure 3:
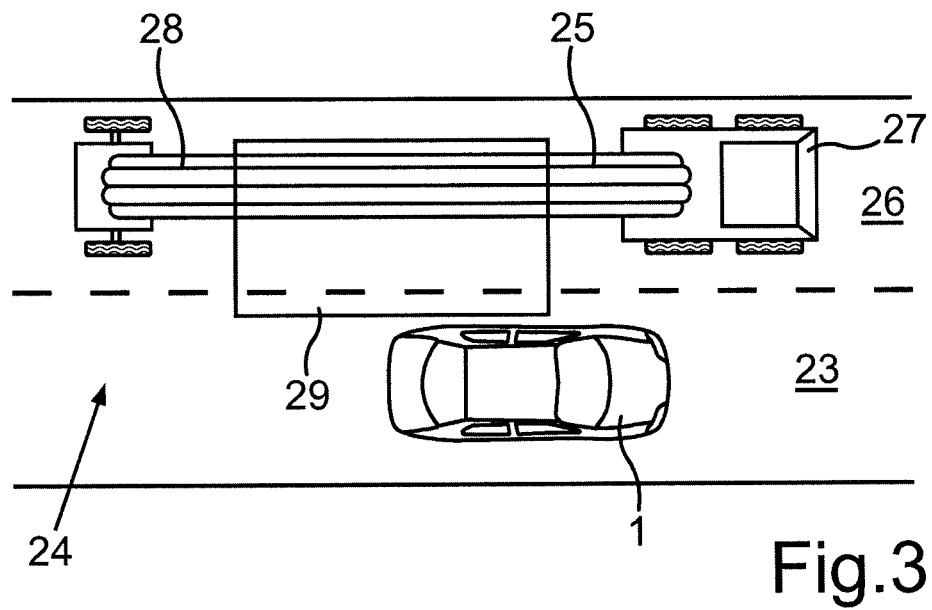
FIG. 3 shows in a schematic illustration a top view of a traffic situation with the motor vehicle according to FIG. 1.

FIG. 3 is a top view of a traffic situation in which the motor vehicle 1 according to FIG. 1 is involved. The motor vehicle 1 is on the right lane 23 of a road 24, for example a two-lane expressway. The motor vehicle 1 is passed by a truck 25 which is on the left lane 26 of the road 24. The truck 25 comprises a tractor unit 27 and a semitrailer or freight 28.

Figure 4:
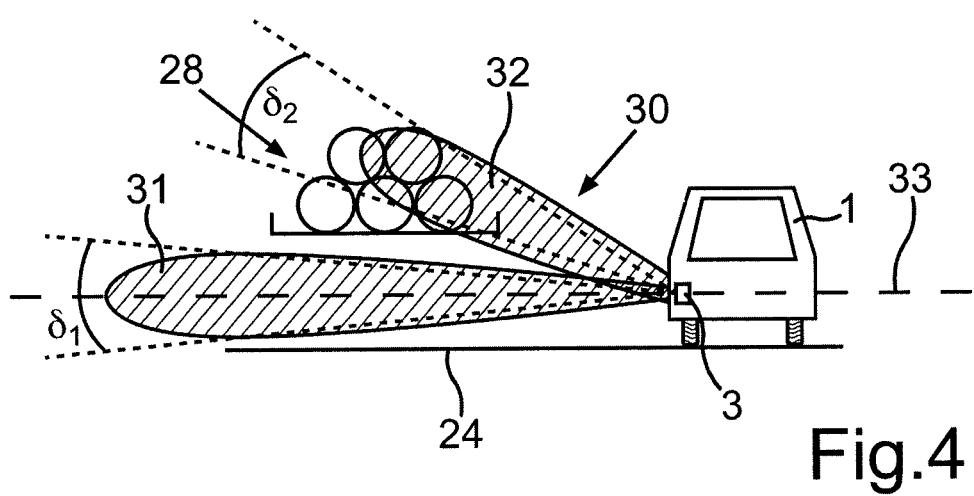
FIG. 4 shows in a schematic illustration a vertical directional characteristic of an antenna unit of the radar device.

Furthermore, in FIG. 3, a left dead angle zone 29 of the motor vehicle 1 is illustrated. Thus, a part of the freight 28 of the truck 25 is in the dead angle zone 29; this part is not visible in the interior mirror or the exterior mirror for the driver of the motor vehicle 1. Here—as described below—the radar device 3 proves to be particularly advantageous:

In FIG. 4, the same traffic situation according to FIG. 3 is illustrated, but in a back view. The motor vehicle 1 is shown with the radar device 3. Of the truck 25, only the freight 28 is illustrated. As is apparent from FIG. 4, the freight 28 is at a significant height above the road 24, approximately at a height of 1.5 m.

FIG. 4 also shows a vertical antenna diagram or a vertical directional characteristic 30 of an antenna unit of the radar device 3. In the exemplary embodiment, the directional characteristic 30 is the one of the transmitting antenna 13 according to FIG. 2. The directional characteristic 30 comprises a main lobe 31 as well as a side lobe 32. In the exemplary embodiment, the power radiated towards the side lobe is approximately 10 dB to 15 dB lower than the power radiated towards the main lobe 31. In other words, a power ratio of main lobe 31 to side lobe 32 lies in a value range of 10 dB to 15 dB and can be, for example, 13 dB.

The main lobe 31 of the directional characteristic is oriented substantially horizontally. This means that the main radiation direction of the main lobe 31 coincides with a horizontal 33 defined with respect to the motor vehicle 1 or with an extension direction of the road 24. A width of the main lobe 31 in the vertical direction or in the elevation direction can lie, for example, in a value range of 5° to 15°.

In the exemplary embodiment, the side lobe 32 is aligned obliquely upwards and covers the freight 28 of the truck 25. The side lobe 32 can enclose an angle with the main lobe 31 from a value range of 10° to 90°, in particular of 30° to 60°. As an example, an angle of approximately 40° can be mentioned here. Thus, in the example, the main radiation direction of the side lobe 32 encloses with the horizontal 33 an angle from the value range of 30° to 60°.

As already explained, the detection zone 7 (see FIG. 1) is defined, on the one hand, by the azimuth angle α and, on the other, by an elevation angle zone. Thus, the detection zone 7 depends on the respective width and on the respective alignment of the main lobe 31 and the side lobe 32 in the vertical direction. The width of the side lobe 32 in the vertical direction can also lie in a value range of 5° to 15°. For example, said width can be 10°. The entire elevation angle zone of the radar device 3 thus includes, on the one hand, a partial angle zone $\delta_1$ which is covered by the main lobe 31, as well as a second partial angle zone $\delta_2$ which is covered by the side lobe 32, namely with respect to the horizontal 33. In the exemplary embodiment, the main lobe 31 covers the partial angle zone $\delta_1$ of approximately −5° to +5° with respect to the horizontal 33. This partial angle zone $\delta_1$ depends directly on the width of the main lobe 31 in the vertical direction. Accordingly, the side lobe 32 covers a partial angle zone $\delta_2$ of approximately 35° to 45° above the horizontal 33. This partial angle zone $\delta_2$ depends directly on the width of the side lobe 32 in the vertical direction as well as on the alignment of the latter.

Thus, overall, the partial angle zone $\delta_2$ is covered in an angle interval of 15° to 90° above the horizontal 33; in the exemplary embodiment even in an angle interval of 30° to 60°.

The entire elevation angle $\delta_1+\delta_2$ of the detection zone 7 of the radar device 3 thus includes the two partial angle zones $\delta_1$, $\delta_2$. This means that the radar device 3 can detect objects located in this elevation angle zone—thus, in the partial angle zone $\delta_1$ and in the partial angle zone $\delta_2$. This is because an electromagnetic wave is radiated by the radar device 3 into the partial angle zones $\delta_1$, $\delta_2$, the power of which electromagnetic wave lies above a predetermined value. This value, for example, can be 20 dB lower than the power radiated in the main radiation direction of the main lobe 31.

In one configuration, it is possible to switch on the side lobe 32 only if needed. This can be achieved, for example, by switching on or off one or more antenna elements of the transmitting antenna units 13.

With respect to a vertical directional characteristic of the receiving antenna unit 17 which is not illustrated in the figure, principally, two embodiments are provided. In the vertical direction, it is possible that the receiving antenna unit 17 has only one main lobe which, however, is relatively wide and covers the partial angle zone $\delta_1$ as well as the partial angle zone $\delta_2$. Alternatively, the directional characteristic of the receiving antenna unit 17 in the vertical direction can correspond to the directional characteristic 30 of the transmitting antenna unit 13. It can also be provided that the transmitting antenna unit 13 has a directional characteristic with a single wide main lobe, whereas the receiving antenna unit 17 has a directional characteristic as it is illustrated in FIG. 4.

The directional characteristics of the antenna units 13, 17 of the radar device 4 correspond to the directional characteristics of the antenna units 13, 17 of the radar device 3.

For generating the vertical directional characteristic 30 as it is illustrated in FIG. 4, the phase and the amplitude of the feed signals of individual antenna elements of the transmitting antenna unit 13 are set accordingly. This takes place through the feed circuit 14 according to FIG. 2. Preferably, the respective phase and the respective amplitude of the feed signals of the individual antenna elements are fixedly set by predefined waveguides of the feed circuit 14. In contrast, the amplitude and the phase of the feed signals of individual antenna elements of the transmitting antenna unit 13 can be electronically controlled in the horizontal direction in order to cover the entire azimuth angle zone α according to FIG. 1 with a main lobe which is relatively narrow in the horizontal direction. It is preferred here that the main lobe 31 as well as the side lobe 32 is also swiveled in the horizontal direction.

As is apparent from FIG. 4, it is possible with such a vertical directional characteristic 30 of the radar device 3 to detect the truck 25 even if the same is not provided with an underrun protection. In the prior art it was not possible to detect such a truck 25 only with the main lobe 31. By using the side lobe 32 it is now possible to detect the freight 28 at any time in a reliable manner and the truck 25 can be detected by the radar device 3 even if the truck is not provided with an underrun protection.

The invention is not limited to the exemplary embodiment illustrated above. In particular, the detection zone 7, 8 of the radar devices 3, 4 in the vertical direction—thus, the respective elevation angle zone $\delta_1+\delta_2$—can also be implemented in a different manner. For example, instead of the asymmetrical vertical directional characteristic 30—as illustrated in FIG. 4—it is also possible to generate a symmetrical directional characteristic 30, namely with one upward side lobe 32 and one downward side lobe. Such an approach might be technically simpler; however, a symmetrical antenna diagram involves the problem of an increased ground clutter. A further alternative is to specifically vertically swivel a single main lobe 31 of the radar device 3. Instead of using a side lobe 32 of the transmitting antenna unit 13, it is also possible to use a further transmitting antenna unit 13. This additional transmitting antenna unit 13 can be aligned such that its main lobe 31 points in the direction of the side lobe 32.

The invention claimed is:

1. A first motor vehicle comprising:
    a radar device for detecting a second motor vehicle located in a detection zone of the radar device,
    wherein the detection zone is defined by an elevation angle zone and an azimuth angle zone,
    wherein the elevation angle zone also covers at least a partial angle zone which lies within an angle interval of 15° to 90° above a horizontal defined with respect to the first motor vehicle,
    wherein the elevation angle zone also covers a further partial angle zone,
    wherein a power ratio of radar signals transmitted within the further partial angle zone and the partial angle zone lies in a value range of 10 dB to 20 dB, and
    wherein the partial angle zone and the further partial angle zone are configured to allow simultaneous transmission of radar signals.

2. The first motor vehicle according to claim 1, wherein the partial angle zone is covered in an angle interval of 30° to 60° above the horizontal.

3. The first motor vehicle according to claim 1, wherein the further partial angle zone lies within an angle interval of −10° to 10° with respect to the horizontal.

4. The first motor vehicle according to claim 1, wherein the azimuth angle covers at least a section of a dead angle zone.

5. The first motor vehicle according to claim 1, wherein the radar device comprises an antenna unit, the directional characteristic of which comprises, in the vertical direction, a main lobe which is horizontally aligned with an accuracy of 10° and a side lobe which encloses with the main lobe an angle from an angle interval of 10° to 90.

6. The first motor vehicle according to claim 5, wherein the side lobe of the directional characteristic can be activated or deactivated by switching on or off individual antenna elements of the antenna unit.

7. The first motor vehicle according to claim 1, wherein the radar device comprises a transmitting antenna unit for transmitting electromagnetic waves, the directional characteristic of which comprises in the vertical direction a main lobe which is horizontally aligned with an accuracy of 10° and a side lobe which encloses with the main lobe an angle from an angle interval of 10° to 90°.

8. The first motor vehicle according to claim 1, wherein the radar device comprises a receiving antenna unit, the directional characteristic of which comprises, in the vertical direction, a main lobe which is horizontally aligned with an accuracy of 10°, and a side lobe which encloses with the main lobe an angle from an angle interval of 10° to 90°.

9. The first motor vehicle according to claim 1, wherein the radar device has a receiving antenna unit, the directional characteristic of which comprises, in the vertical direction, a main lobe by which the entire elevation angle zone is covered.

10. A method for operating a radar device in a first motor vehicle, comprising:
    detecting a second motor vehicle located in a detection zone of the radar device,
    wherein the detection zone is defined by an elevation angle zone and an azimuth angle zone,
    wherein the elevation angle zone also covers at least such a partial angle zone which lies within an angle interval of 15° to 90° above a horizontal defined with respect to the first motor vehicle,
    wherein the elevation angle zone also covers a further partial angle zone,
    wherein a power ratio of radar signals transmitted within the further partial angle zone and the partial angle zone lies in a value range of 10 dB to 20 dB, and
    wherein the partial angle zone and the further partial angle zone are configured to allow simultaneous transmission of radar signals.

* * * * *